United States Patent
Katayama et al.

(10) Patent No.: US 9,399,484 B2
(45) Date of Patent: Jul. 26, 2016

(54) VEHICLE STEERING SYSTEM

(71) Applicant: HONDA MOTOR CO., LTD., Minato-Ku, Tokyo (JP)

(72) Inventors: Hirotaka Katayama, Wako (JP); Kuniyoshi Tanaka, Wako (JP); Yasushi Ueda, Wako (JP); Yuuki Oikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/599,633

(22) Filed: Jan. 19, 2015

(65) Prior Publication Data

US 2015/0203149 A1    Jul. 23, 2015

(30) Foreign Application Priority Data

Jan. 21, 2014    (JP) .................................. 2014-008339

(51) Int. Cl.
*B60Q 1/16*    (2006.01)
*B62D 5/00*    (2006.01)

(52) U.S. Cl.
CPC ...................................... *B62D 5/003* (2013.01)

(58) Field of Classification Search
CPC ........ B62D 5/0478; B62D 5/046; B62D 6/08; B62D 1/163; B62D 5/0409; B60Q 1/0082; Y10T 137/6884
USPC ...................... 701/41-43; 180/333, 443, 446; 137/352; 475/18, 19, 21, 28
See application file for complete search history.

(56) References Cited

U.S. PATENT DOCUMENTS

| | | | | | |
|---|---|---|---|---|---|
| 7,469,768 | B2* | 12/2008 | Chino | .................... | B62D 1/163 180/402 |
| 7,690,475 | B2* | 4/2010 | Tsutsumi | ............... | B62D 5/001 180/402 |
| 7,708,108 | B2* | 5/2010 | Miyasaka | .............. | B62D 5/001 180/402 |
| 2010/0324796 | A1* | 12/2010 | Takeuchi | .................. | B60T 7/18 701/70 |

FOREIGN PATENT DOCUMENTS

JP    2006-240398 A    9/2006

* cited by examiner

*Primary Examiner* — Dalena Tran
(74) *Attorney, Agent, or Firm* — Carrier Blackman & Associates, P.C.; William D. Blackman; Jingli Wang

(57) ABSTRACT

A vehicle steering system that hardly gives a driver a feeling of strangeness even in mode switching is provided. Even if condition such as a defect of a system, which caused switching from SBW mode to EPS mode, has been resolved, a mode switching section waits for a timing of switching from EPS mode to SBW mode until a second condition is satisfied. The second condition is that the vehicle is in a certain state in which the driver hardly notices mode switching. The mode switching section waits for and judges a timing when the vehicle becomes into a certain state in which the driver hardly notices mode switching, and then performs switching from EPS mode to SBW mode.

7 Claims, 2 Drawing Sheets

VEHICLE STEERING SYSTEM

CROSS REFERENCE TO RELATED APPLICATION

This application claims the priority of Japanese Patent Application No. 2014-008339, filed on Jan. 21, 2014, the entire specification, claims and drawings of which are incorporated herewith by reference.

BACKGROUND OF THE INVENTION

1. Field of the Invention

The present invention relates to a vehicle steering system.

2. Description of the Related Art

As disclosed by JP 2006-240398 A, in a steer-by-wire vehicle steering system, when the system is in normal operation, the system operates in SBW (Steer By Wire) mode in which the vehicle is steered by steer-by-wire. On the other hand, when a defect has occurred on the system, the system operates in EPS (Electronic Power Steering) mode in which assist force on steering is generated by a reaction force motor or a steering motor.

SUMMARY OF THE INVENTION

As described above, mode switching from SBW mode to EPS mode is performed in the event of occurrence of a defect on the system. Accordingly, when such a defect has occurred, SBW mode is immediately switched to EPS mode. Then, after the mode is switched to EPS mode in such a manner, the above-described defect of the system may be solved during when EPS mode is in operation, In this case, EPS mode is switched back to SBW mode.

A vehicle steering system implementing steer-by-wire is provided with a connecting mechanism (clutch mechanism) for selectively cutting off from each other or connecting with each other the steering wheel side and the steering mechanism side. In performing mode switching between SBW mode and EPS mode, an electromagnetic solenoid is activated to operate the clutch mechanism. Consequently, when such mode switching is performed, operation sounds of the electromagnetic solenoid or gears are generated. Further, such mode switching makes a change in the steering force, which is noticed by the driver as reaction feeling at hand from the steering wheel. Consequently, in mode switching between EPS mode and SBW mode, feeling of strangeness due to the above-described sounds of operation and the reaction feeling at hand from the steering wheel is given to the driver.

As described-above, as mode switching from SBW mode to EPS mode is performed in the event of occurrence of a defect on the system, it is necessary to immediately perform mode switching even if feeling of strangeness is given to the driver.

However, in switching back from EPS mode to SBW mode, it is not necessary to immediately switch the mode back to SBW mode even when the defect of the system has been resolved, and it is also possible to perform mode switching at a timing, taking into account the feeling of strangeness that the driver would have.

In this situation, an object of the present invention is to provide a vehicle steering system that hardly gives a feeling of strangeness to a driver even in switching the mode.

In an embodiment of the present invention, a vehicle steering system includes: a steering section for operation input via a steering member for steering a vehicle; a steering mechanism for steering one or more steered wheels of the vehicle; a connecting mechanism for selectively connecting or cutting off the steering section side and the steering mechanism side with or from each other; a steering reaction force actuator for applying steering reaction force to the steering section; a steering actuator for applying steering torque to the steering mechanism; a steering-torque-information obtaining section for obtaining information on steering torque of the steering member; a first mode control section for executing a first mode to control the clutch mechanism, the steering reaction force actuator, and the steering actuator in such a manner as to drive the steering actuator so that a steering angle becomes corresponding to an operation state of the steering member, cutting off the steering section side and the steering mechanism side from each other by the clutch mechanism, and as to drive the steering reaction force actuator so that a steering reaction force corresponding to a steering state of the steering mechanism is applied to the steering member; a second mode control section for executing a second mode to control the clutch mechanism, the steering reaction force actuator, and the steering actuator in such a manner as to drive at least one of the steering reaction force actuator and the steering actuator, connecting the steering section side and the steering mechanism side by the clutch mechanism and based on the information obtained by the steering-torque-information obtaining section; and a mode switching section, wherein, if a first condition is satisfied during when the first mode is executed, the mode switching section switches mode from the first mode to the second mode, and if the second condition is satisfied after the first condition has been resolved following the switching from the first mode to the second mode, the mode switching section switches the mode from the second mode to the first mode. In this aspect of the present invention, even when the first condition having caused the switching from the first mode to the second mode is released, the mode switching section waits for a timing of switching from the second mode to the first mode until the second condition appropriate for switching from the second mode to the first mode is satisfied. Accordingly, a driver is hardly given a feeling of strangeness even when the mode is switched.

In the above, an arrangement may be made such that the vehicle includes a state determining section for determining that the vehicle is in a certain state in which a driver hardly notices switching of the mode, and that the mode switching section makes the determination, made by the state determining section, that the vehicle is in the certain state be the second condition.

In this aspect of the invention, it is possible to wait for and judge a timing when the vehicle becomes into a certain state in which the driver hardly notices mode switching, and then timely execute switching from the second mode to the first mode. Accordingly, the driver is hardly given a feeling of strangeness even when the mode is switched.

In the above, an arrangement may be made such that when angle of steering by the steering mechanism has become larger than or equal to a predetermined steering angle, the state determining section determines that the vehicle is in a certain state in which a driver hardly notices switching of the mode.

In this aspect of the invention, the operation sounds of the connecting mechanism generated by switching the mode from the second mode to the first mote are covered by sounds generated by the steering mechanism. Accordingly, the driver is hardly given a feeling of strangeness even when the mode is switched.

In the above, an arrangement may be made such that when the vehicle starts an engine, the state determining section determines that the vehicle is in a certain state in which a driver hardly notices switching of the mode.

In this aspect of the invention, the operation sounds of the connecting mechanism generated by switching the mode from the second mode to the first mote are covered by operation sounds of cranking at the time of the start of the engine. Accordingly, the driver is hardly given a feeling of strangeness even when the mode is switched.

In the above, an arrangement may be made such that when the vehicle passes thorough an ETC gate, the state determining section determines that the vehicle is in a certain state in which a driver hardly notices switching of the mode.

In this aspect of the invention, active steering is unnecessary when the vehicle passes through an ETC gate, and the driver is not strongly gripping the steering member in most cases. Accordingly, the driver is hardly given a feeling of strangeness even when the mode is switched.

In the above, an arrangement may be made such that when the vehicle starts automatic operation, the state determining section determines that the vehicle is in a certain state in which a driver hardly notices switching of the mode.

In this aspect of the invention, when the vehicle starts automatic operation, it is thought that the driver has a low motivation to operate the vehicle himself/herself, and the driver does not strongly grips the steering member in most cases. Accordingly, the driver is hardly given a feeling of strangeness even when the mode is switched.

An arrangement may be made such that when an operating section provided on the vehicle to switch the mode from the second mode to the first mode has been operated, the state determining section determines that the vehicle is in a certain state in which a driver hardly notices switching of the mode.

In this aspect of the invention, the operation of the operation section switches the mode from the second mode to the first mode, according to the will of the driver. Accordingly, the driver is hardly given a feeling of strangeness even when the mode is switched.

According to the invention, it is possible to provide a vehicle steering system that hardly gives a driver a feeling of strangeness even in performing mode switching.

DETAILED DESCRIPTION OF THE PREFERRED EMBODIMENTS

An embodiment according to the present invention will be described below.

Figure 1:
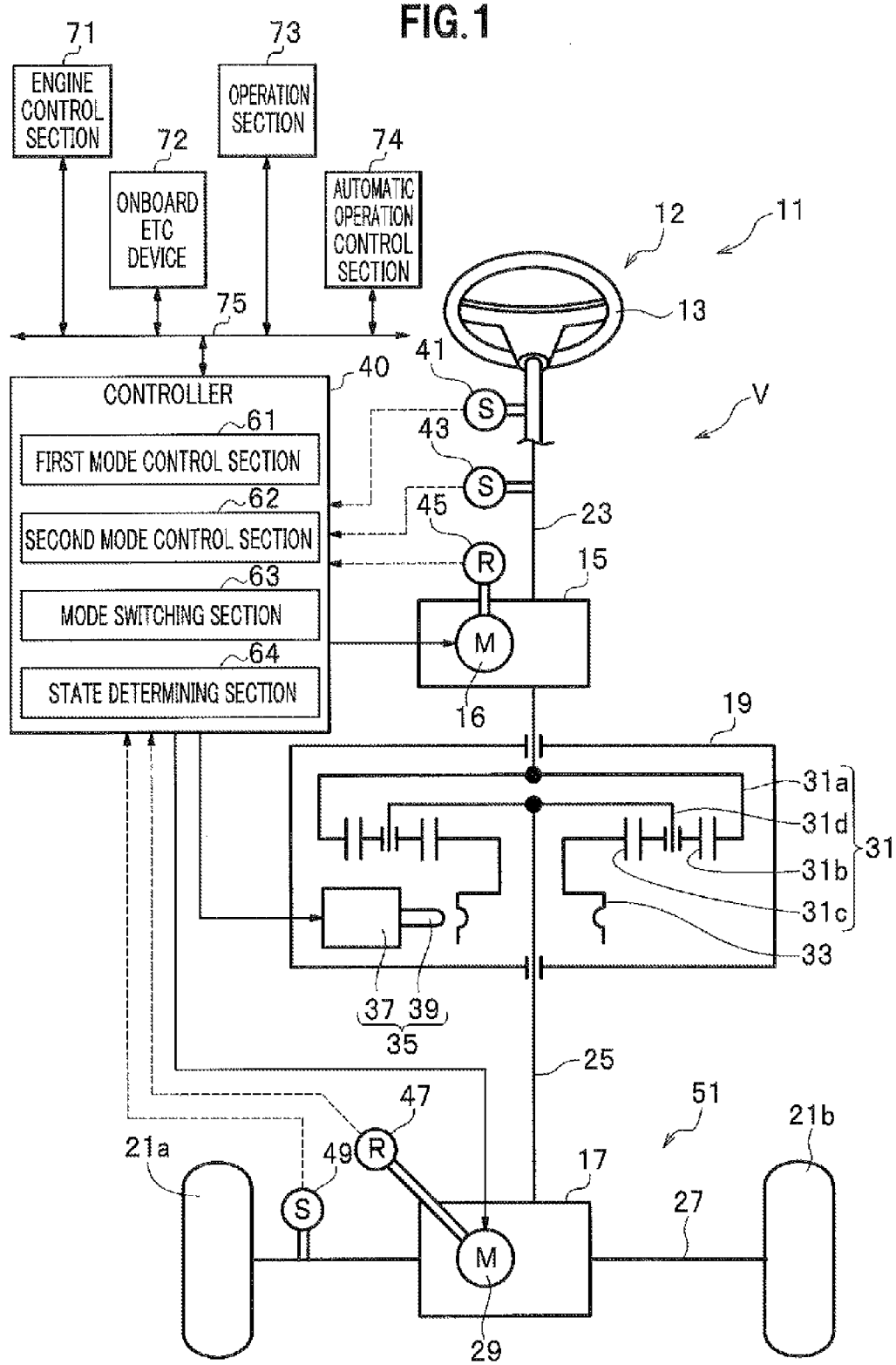
FIG. 1 is a schematic structural diagram of a vehicle steering system in an embodiment according to the present invention.

FIG. 1 is a schematic structural diagram of a vehicle steering system in an embodiment according to the present invention.

A vehicle steering system 11 is a steer-by-wire (SBW) steering device. The vehicle steering system 11 has a function (SBW mode) to generate steering force by driving a steering motor 29. Further, the vehicle steering system 11 is also provided with an EPS (electronic power steering) function (EPS mode) to generate assist force by driving the steering motor 29 on steering by manual operation by a driver in a case of a defect of the system caused, for example, by a failure of a steering reaction force motor 16. Still further, the vehicle steering system 11 is also provided with a function (manual steering mode) for the driver to perform manual steering, for example, upon occurrence of a defect of the steering reaction force motor 16 and the steering motor 29.

In order to realize the above-described respective functions, the vehicle steering system 11 is provided with, as shown in FIG. 1, a steering section 12, a steering reaction force generating device 15, a steering device 17, a clutch mechanism 19 (connecting mechanism), a controller 40, and the like. The vehicle steering system 11 is mounted on a vehicle V. The vehicle V is provided with a pair of steered wheels 21a, 21b.

The steering section 12 is a device for input for operating a steering wheel 13 (steering member) for steering the vehicle V. The steering wheel 13 of the steering section 12 is a member for steering the vehicle V operated according to the operational will of a driver. The steering wheel 13 is provided with a steering shaft 23. The steering shaft 23 is arranged such as to rotate around the axis thereof, according to the operation of the steering wheel 13 by the driver.

The steering reaction force generating device 15 has a function, during when the vehicle steering system 11 is in operation in SBW mode, to generate a reaction force at hand (reaction feeling at hand), namely steering reaction force, of the driver gripping the steering wheel 13, the reaction force being related to steering. The steering reaction force generating device 15 includes the steering reaction force motor 16 (steering reaction force actuator). The steering shaft 23 is connected to the steering reaction force motor 16. The steering reaction force motor 16 generates steering torque for rotating the steering shaft 23 around the axis. Thus, during when the vehicle steering system 11 is operating in SBW mode, reaction force (reaction feeling at hand) related to steering is transferred to the hands of the driver gripping the steering wheel 13.

The steering device (steering gear box) 17 has a function to convert the rotational motion of a steering shaft 25 through a known rack and pinion mechanism (not shown) into the linear motion of a rack shaft 27. This rack and pinion mechanism is housed in the housing of the steering device 17, wherein the rack and pinion thereof engage with each other. The rack is formed on the rack shaft 27. The steering device 17 includes the steering motor 29 (steering actuator). The steering shaft 25 and the rack shaft 27 are connected to the steering motor 29. The steering motor 29 generates steering torque for linier motion of the rack shaft 27 along the axial direction. The pair of steered wheels 21a, 21b is connected to the rack shaft 27 through a tie rod not shown. The pair of steered wheels 21a, 21b is steered by the linear motion of the rack shaft 27. The steering shaft 25, the rack shaft 27, the steering device 17 and the like construct a steering mechanism 51 that performs steering of the steered wheels 21a, 21b.

The clutch mechanism 19 has a function to selectively connect or cut off the steering shaft 23 and the steering shaft 25, with or from each other. In order to realize this function, the clutch mechanism 19 is provided with a planetary gear train 31. The planetary gear train 31 includes an internal gear 31a, planetary gears 31b, a sun gear 31c, and a planet carrier 31d.

Further, the clutch mechanism 19 is also provided with a locking gear 33 and a lock device 35. The lock device 35 includes a lock pin 39 engaging with a tooth space of the locking gear 33, and an electromagnetic solenoid 37 for driving the lock pin 39.

The internal gear 31a is fixed to the lower end side of the steering shaft 23 and is arranged such as to rotate integrally with the steering shaft 23. The sun gear 31c is rotatable around a rotation axis that is common with the axis of the steering shaft 25. Plural planetary gears 31b are provided such as to engage with both the sun gear 31c and the internal gear 31a. Each of the plural planetary gears 31b is axially supported to be able to rotate relative to the planet carrier 31d that rotates integrally with the steering shaft 25.

The locking gear 33 is an external gear. The locking gear 33 rotates integrally with the sun gear 31c. The lock pin 39 is urged by an urging member (an elastic member), not shown, in the direction toward the locking gear 33. An arrangement is made such that when the lock pin 39 engages with a tooth space of the locking gear 33, the rotational motion of the locking gear 33 is restricted.

The electromagnetic solenoid 37 displaces the lock pin 39 such as to draw in the lock pin 39 by supply of excitation current so as to release the engagement between the lock pin 39 and the locking gear 33.

The lock device 35 operates, according to a control signal transmitted from the controller 40. The controller 40 operates to release the engagement of the lock pin 39 with the locking gear 33 by supply of excitation current to the electromagnetic solenoid 37.

The operation of the clutch mechanism 19 will be described below. When the lock pin 39 engages with a tooth space of the locking gear 33, the rotational motion of the sun gear 31c, which integrally rotates with the locking gear 33, is restricted.

When the driver operates the steering wheel 13 in a state that the rotational motion of the sun gear 31c is restricted, the internal gear 31a rotates in association with the rotation of the steering shaft 23. Herein, as the rotational motion of the sun gear 31c is restricted, the planetary gears 31b orbit the sun gear 31c, while spinning. By the spinning of the planetary gears 31b, the planet carrier 31d, which axially supports the planetary gears 31b, and the steering shaft 25, which rotates integrally with the planet carrier 31d, rotate. Herein, the ratio of the rotation angle of the steering shaft 25 to the rotation angle of the steering shaft 23 is mechanically predetermined by the clutch mechanism 19.

In short, in a state that the electromagnetic solenoid 37 is OFF and the lock pin 39 is engaged with a tooth space of the locking gear 33, the clutch mechanism 19 is in a connecting state connecting the steering shaft 23 and the steering shaft 25. Herein, the rotation force of the steering shaft 23 is transmitted to the steering shaft 25. On the other hand, when the electromagnetic solenoid 37 becomes ON, and the engagement of the lock pin 39 with the tooth space of the locking gear 33 is released, the sun gear 31c having been rotating integrally with the locking gear 33 becomes into a state of being freely rotatable.

In a state that the sun gear 31c is freely rotatable, when the driver operates the steering wheel 13, the internal gear 31a rotates in association with the rotation of the steering shaft 23. Herein the planetary gears 31b act to orbit the sun gear 31c, while spinning. However, the planet carrier 31d is connected through the steering shaft 25 and the rack shaft 27 with the steered wheels 21a, 21b. Accordingly, the resistance force against the rotation of the planet carrier 31d is significantly stronger than the resistance force against the rotation of the sun gear 31c, which is in a state of being freely rotatable. Thus, when the planetary gears 31b spin, the sun gear 31c rotates (spins), and the planet carrier 31d does not rotate. That is, the steering shaft 25 does not rotate.

In short, in a state that the electromagnetic solenoid 37 is ON and the engagement of the lock pin 39 with a tooth space of the locking gear 33 is released, the clutch mechanism 19 becomes into a cut-off state of cutting off the connection between the steering shaft 23 and the steering shaft 25. Herein, the rotation force of the steering shaft 23 is not transmitted to the steering shaft 25.

The controller 40 is a controller for controlling the vehicle steering system 11. The controller 40 is configured mainly by a microcomputer. To the controller 40, connected are a steering angle sensor 41, a steering torque sensor 43, a steering reaction force motor resolver 45, a steering motor resolver 47, and a rack stroke sensor 49, as an input system.

The steering angle sensor 41 and the steering torque sensor 43 are arranged at the steering shaft 23. The steering angle sensor 41 detects the steering rotation amount (steering angle) of the steering wheel 13 by the driver, and provides the detected steering angle information to the controller 40.

Further, the steering torque sensor 43 (steering-torque-information obtaining section) detects the steering torque of the steering wheel 13 by the driver, and provides the information on the detected torque (steering torque information) to the controller 40.

The steering reaction force motor resolver 45 is arranged at the steering reaction force motor 16. The steering reaction force motor resolver 45 detects the rotation operation amount (steering angle) of the steering reaction force motor 16, and provides the detected steering angle information to the controller 40.

The steering motor resolver 47 is arranged at the steering motor 29. The steering motor resolver 47 detects the rotation operation amount (steering angle) of the steering motor 29, and provides the detected steering angle information to the controller 40.

The rack stroke sensor 49 is arranged at the rack shaft 27. The rack stroke sensor 49 detects the linear motion amount (steering angle) of the rack shaft 27, and provides the detected steering angle information to the controller 40.

On the other hand, to the controller 40, connected are the steering reaction force motor 16, the steering motor 29, and the electromagnetic solenoid 37, as an output system.

Further, the controller 40 can communicate through a CAN (Controller Area Network) 75 with an engine control section 71, an onboard ETC device 72, an operation section 73, and an automatic operation control section 74.

The engine control section 71 is a controller for controlling an engine that drives the vehicle V. Accordingly, the engine control section 71 can recognize the state of this engine, and notify the controller 40 of information on the state of the engine.

The onboard ETC device 72 is a device mounted on the vehicle V to use an electronic toll collection system. That is, toll of highway, a toll road, or the like is collected by performing wireless communication between the onboard ETC device 72 and a system on the ETC gate side at the time the vehicle V passes through an ETC gate of a highway, a toll road, or the like. The onboard ETC device 72 is connected with the system of the vehicle V directly or indirectly through a car navigation system to be able to notify the controller 40 of the state of the vehicle V that the vehicle V is passing through an ETC gate of a highway, a toll road, or the like.

The operation section 73 includes a lever, a switch, and the like provided on an instrument panel in the compartment of the vehicle V, and the operation of the operation section 73 relates to the control of the later-described mode switching section 63 (Details will be described later.)

The automatic operation control section 74 performs control of automatic operation of the vehicle V, including control of a lane keeping assist system and control for following traffic jam (see JP H10-338052 A, etc.) The automatic operation control section 74 can notify the controller 40 of the state of the vehicle V as to whether or not such automatic operation is being performed.

The contents of control executed by the controller 40 will be described below. The controller 40 is provided with a first mode control section 61, a second mode control section 62, and the mode switching section 63.

The first mode control section 61 performs control of the above-described SBW mode (first mode). That is, the first mode control section 61 controls (the electromagnetic solenoid 37 of) the clutch mechanism 19, the steering motor 29, and the steering reaction force motor 16, and executes SBW mode. That is, in operating SBW mode, the first mode control section 61 operates the electromagnetic solenoid 37 and maintains by the clutch mechanism 19 a state that the steering section 12 side and the steering mechanism 51 side are cut off from each other. The first mode control section 61 drives the steering motor 29 so that steering angle corresponding to the operation state of the steering wheel 13 detected by the steering angle sensor 41 is applied. Further, the first mode control section 61 drives the steering reaction force motor 16 to apply a steering reaction force to the steering wheel 13, corresponding to the steering state by the steering mechanism 51 (detected by the rack stroke sensor 49 (or the steering motor resolver 47)). Thus, the first mode control section 61 can generate steering force by driving the steering motor 29.

The second mode control section 62 performs control of the above-described EPS mode (second mode). That is, the second mode control section 62 controls (the electromagnetic solenoid 37 of) the clutch mechanism 19, the steering motor 29, and the steering reaction force motor 16, and executes EPS mode. That is, maintaining a state that the lock pin 39 is engaged with the locking gear 33 without driving the electromagnetic solenoid 37, the second mode control section 62 maintains a state that the steering section 12 side and the steering mechanism 51 side are connected with each other (a state that manual steering force is transmitted to the steering mechanism 51). Then, the second mode control section 62 drives at least one of the steering reaction force motor 16 and the steering motor 29, based on steering torque information detected by the steering torque sensor 43. Thus, the second mode control section 62 can generate assist force on the steering that is executed by manual operation of the driver.

The mode switching section 63 performs control of mode switching between SBW mode by the first mode control section 61 and EPS mode by the second mode control section 62 (Incidentally, as described above, although manual mode is also available, description of the details of the manual mode and description of switching to the manual mode will be omitted.) That is, the mode switching section 63 normally maintains SBW mode, however, when a failure has occurred on the system, such as at a time when abnormality of the steering reaction force motor 16 has been detected, the mode switching section 63 performs control to switch the mode from SBW mode to EPS mode.

After switching the mode to EPS mode in such a manner, there is a case that the above-described failure of the system is resolved during when EPS mode is in operation. In this case, the mode switching section 63 performs control to switch the mode back from EPS mode to SBW mode.

As described above, in order to switch from EPS mode to SBW mode, the electromagnetic solenoid 37 is driven to thereby operate the clutch mechanism 19 (cut off the steering section 12 side and the steering mechanism 51 side from each other.) Consequently, when this mode switching is performed, operation sounds of the electromagnetic solenoid 37 and the gears constructing the clutch mechanism 19 are generated. Further, such mode switching makes a change in the steering force, which is noticed by the driver as reaction feeling at hand from the steering wheel 13. Consequently, in mode switching from EPS mode to SBW mode, feeling of strangeness due to the above-described sounds of operation and the reaction feeling at hand from the steering wheel 13 is given to the driver.

As described above, switching from SBW mode to EPS mode is performed in a case a defect has occurred on the system. In this case also, the above-described operation sounds of the electromagnetic solenoid 37 and the gears and the reaction feeling at hand from the steering wheel 13 due to a change in the steering force are generated, however, as these are caused by a defect of the system, it is necessary to immediately perform mode switching even if feeling of strangeness is given to the driver.

On the other hand, when the mode is switched back from EPS mode to SBW mode, although SBW mode is capable of performing finer control, immediate switching mode back to SBW mode is not essential even when the above-described defect of the system has been resolved, and it is also possible to perform mode switching at a timing, taking into account the feeling of strangeness the driver would have.

Figure 2:
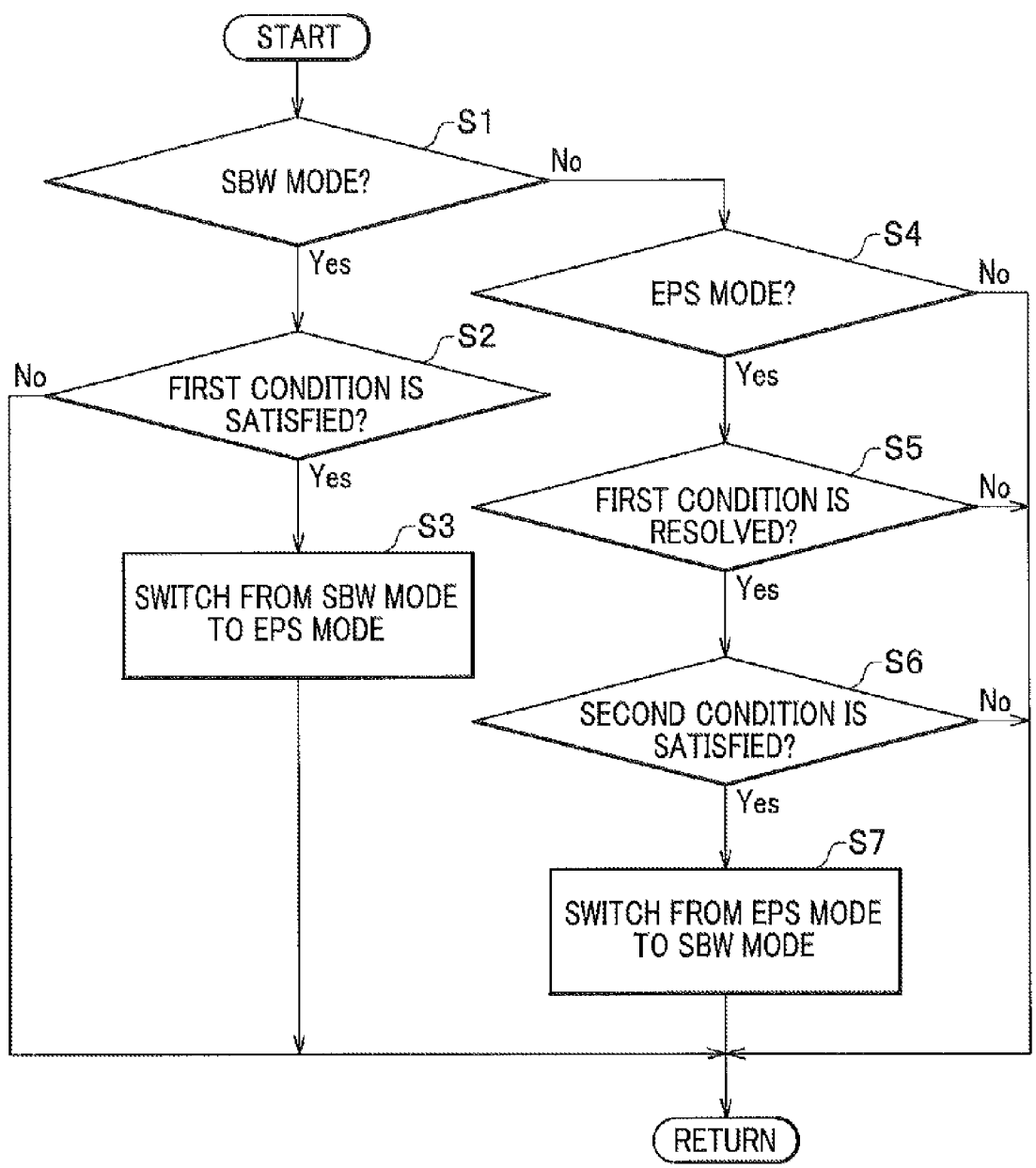
FIG. 2 is a flowchart illustrating a process executed by the mode switching section of a vehicle steering system in an embodiment according to the invention.

In this situation, the vehicle steering system 11 performs the following control by the mode switching section 63. FIG. 2 is a flowchart illustrating an example of such contents of control.

First, when the vehicle steering system 11 is in SBW mode (first mode) (Yes in S1), the mode switching section 63 determines whether or not a first condition for switching from SBW mode to EPS mode (second mode) is satisfied (S2). The first condition is for example occurrence of a defect that prohibits the system to continue SBW mode, such as abnormality (temperature rise, etc.) of the steering reaction force motor 16. If the first condition is satisfied (Yes in S2), the mode switching section 63 switches the mode from SBW mode to EPS mode (S3). Then, the process returns to S1. If the first condition is not satisfied (No in S2), the process returns to S1.

On the other hand, if the vehicle steering system 11 is not in SBW mode (No in S1) but in EPS mode as a result of execution of S3 (Yes in S4), then the mode switching section 63 determines whether or not the above-described first condition has been resolved (S5). After the first condition has been resolved (Yes in S5), the mode switching section 63 determines whether or not a second condition is satisfied (S6). Determination on whether or not the second condition is satisfied is concretely determined by a state determining section 64 (FIG. 1), and based on this determination, the mode switching section 63 determines whether or not the second condition is satisfied. The second condition is that, even when the vehicle V switches from EPS mode to SBW mode, the system is in a certain state in which the drive hardly notices this switching (or this switching can be made unrecognizable). A concrete example of this 'certain state' will be described later. If the second condition is satisfied (Yes in S6), the mode switching section 63 switches from EPS mode to SBW mode (S7). If the system is not in EPS mode (No in S4), if the first condition has not been resolved (No in S5), or if the second condition is not satisfied (No in S6), the process returns to S1.

In the vehicle steering system 11 in the present embodiment as described above, by executing the process in FIG. 2, even if the first condition, which caused the switching from SBW mode to EPS mode, has been resolved (Yes in S5), the mode switching section 63 waits for a timing of switching from EPS mode to SBW mode until the second condition is satisfied (Yes in S6). The second condition is that the vehicle V is in a certain state in which the driver hardly notices mode switching. The mode switching section 63 waits for and judges a timing when the vehicle V becomes into a certain state in which the driver hardly notices mode switching, and then timely executes switching from EPS mode to SBW mode. Accordingly, the driver is hardly given a feeling of strangeness even when the mode switching section 63 switches the mode from EPS mode to SBW mode.

As described above, the state determining section 64 performs determination on the second condition. A concrete example of determination on the second condition will be described below. Herein, if any one of five conditions (1) to (5) is satisfied, it is determined that the second condition is satisfied.

(1) The second condition is satisfied when steering has been performed by the vehicle steering system 11 close to the maximum steering angle (up to a predetermined steering angle or more).

The state determining section 64 can determine this state by a detection signal from the rack stroke sensor 49 (or the steering motor resolver 47). That is, when steering has been performed close to the maximum steering angle, the steering reaction force increases also in EPS mode, and the driver hardly notices a small change in the feeling at hand from the steering wheel 13. In this situation, the rack end of in the above-described rack and pinion mechanism of the steering device 17 apts to collide with the housing of the steering device 17. Consequently, as a sound of this collision is generated, even when operation sounds of the electromagnetic solenoid 37 and the above-described gears constructing the clutch mechanism 19 are generated by switching from EPS mode to SBW mode, the driver hardly notices these operation sounds, due to the above-described sound of collision. Accordingly, in this case, the driver is hardly given a feeling of strangeness even when mode switching from EPS mode to SBW mode is performed.

(2) When the vehicle V is in a state of engine start, the second condition is satisfied.

As described above, the state of the engine that drives the vehicle V is recognized by the engine control section 71, and information on the state of the engine is notified to the controller 40. Accordingly, the state determining section 64 can determine whether or not the engine is in a starting state.

When the engine starts, the operation sound of cranking covers the operation sounds of the electromagnetic solenoid 37 and the above-described gears constructing the clutch mechanism 19 generated by switching from EPS mode to SBW mode. Accordingly, in this case, the driver is hardly given a feeling of strangeness even when the mode is switched from EPS mode to SBW mode.

(3) When the vehicle V passes through an ETC gate, the second condition is satisfied.

As described above, the onboard ETC device 72 notifies the controller 40 of the state of the vehicle that the vehicle is passing through an ETC gate of a highway, a toll road, or the like. When the vehicle V passes through an ETC gate, active steering is unnecessary, and it is thought that the driver is not strongly gripping the steering wheel 13 in most cases. Accordingly, in this case, even when switching from EPS mode to SBW mode is performed, the driver hardly notices a change in the feeling at hand on the steering wheel 13. Accordingly, in this case, the driver is hardly given a feeling of strangeness even if the mode is switched from EPS mode to SBW mode.

(4) When the vehicle V is starting automatic operation, the second condition is satisfied.

As described below, the automatic operation control section 74 notifies the controller 40 of the state of the vehicle V about whether or not control of automatic operation of a lane keeping assist system, controlling for following traffic jam, and the like, is performed. Thus, the state determining section 64 can determine whether or not the vehicle V is starting automatic operation.

When automatic operation is started, it is thought that the driver has a low motivation to operate the vehicle V for himself/herself and the driver does not operate the steering wheel 13 with a strong force in most cases. Accordingly, even if mode switching from EPS mode to SBW mode is performed then, the driver hardly notices a change in the feeling at hand from the steering wheel 13. Therefore, in this case, the driver is hardly given a feeling of strangeness even if the mode is switched from EPS mode to SBW mode.

(5) When the operation section 73, which includes a lever, a switch, and the like and is provided on the instrument panel in the compartment of the vehicle V, is operated, the second condition is satisfied.

That is, the operation section 73 is a device for the driver to manually perform mode switching from EPS mode to SBW mode.

When the driver operates the operation section 73, it is a time when the driver dares to operate the operation section 73, knowing that a change in the feeling at hand from the steering wheel 13 and operation sounds of the electromagnetic solenoid 37 and the above-described gears constructing the clutch mechanism 19 will be generated, by mode switching from EPS mode to SBW mode. Accordingly, in this case, the driver is hardly given a feeling of strangeness even in switching the mode from EPS mode to SBW mode.

Incidentally, instead of determining each of all the conditions from (1) to (5) about whether or not condition is satisfied, the state determining section 64 may be arranged to determine on only one or plural conditions out of all the conditions about whether or not condition is satisfied. Or, the state determining section 64 may be arranged to determine a condition other than the conditions (1) to (5) about whether or not condition is satisfied, as the second condition. This is a condition in which the vehicle V is in a certain state in which the driver hardly notices switching from SBW mode to EPS mode.

What is claimed is:

1. A vehicle steering system, comprising:
    a steering section for operation input via a steering member for steering a vehicle;
    a steering mechanism for steering one or more steered wheels of the vehicle;
    a connecting mechanism for selectively connecting or cutting off the steering section side and the steering mechanism side with or from each other;
    a steering reaction force actuator for applying steering reaction force to the steering section;
    a steering actuator for applying steering torque to the steering mechanism;
    a steering-torque-information obtaining section for obtaining information on steering torque of the steering member;
    a SBW (Steer By Wire) mode control section for executing a SBW mode to control a clutch mechanism, the steering reaction force actuator, and the steering actuator in such a manner as to drive the steering actuator so that a steering angle becomes corresponding to an operation state of the steering member, cutting off the steering section side and the steering mechanism side from each other by the clutch mechanism, and as to drive the steering reaction force actuator so that a steering reaction force corresponding to a steering state of the steering mechanism is applied to the steering member;

an EPS (Electronic Power Steering) mode control section for executing an EPS mode to control the clutch mechanism, the steering reaction force actuator, and the steering actuator in such a manner as to drive at least one of the steering reaction force actuator and the steering actuator, connecting the steering section side and the steering mechanism side by the clutch mechanism and based on the information obtained by the steering-torque-information obtaining section; and a mode switching section, wherein:

while the vehicle is executing SBW control, if a first condition, which is an increase in temperature, is satisfied, the mode switching section switches mode from the SBW mode to the EPS mode, and while the vehicle is executing EPS control, if a second condition is satisfied after the first condition has been resolved, the mode switching section switches the mode from the EPS mode to the SBW mode.

2. The vehicle steering system according to claim 1, further comprising: a state determining section for determining whether the vehicle is in a certain state in which a driver hardly notices switching of the mode, and wherein when the mode switching section makes the determination, made by the state determining section, that the vehicle is in the certain state, the vehicle is in the EPS mode and the second condition is satisfied.

3. The vehicle steering system according to claim 2, wherein when an angle of steering applied by the steering mechanism has become larger than or equal to a predetermined steering angle, the state determining section determines that the vehicle is in a certain state in which a driver hardly notices switching of the mode.

4. The vehicle steering system according to claim 2, wherein when the vehicle starts an engine, the state determining section determines that the vehicle is in a certain state in which a driver hardly notices switching of the mode.

5. The vehicle steering system according to claim 2, wherein when the vehicle passes thorough an ETC gate, the state determining section determines that the vehicle is in a certain state in which a driver hardly notices switching of the mode.

6. The vehicle steering system according to claim 2, wherein when the vehicle starts automatic operation, the state determining section determines that the vehicle is in a certain state in which a driver hardly notices switching of the mode.

7. The vehicle steering system according to claim 2, wherein when an operating section provided on the vehicle to switch the mode from the EPS mode to the SBW mode has been operated, the state determining section determines that the vehicle is in a certain state in which a driver hardly notices switching of the mode.

* * * * *